GEORGE COOK.
Improvement in Scroll-Sawing Machines.
No. 114,768.  Patented May 16, 1871.
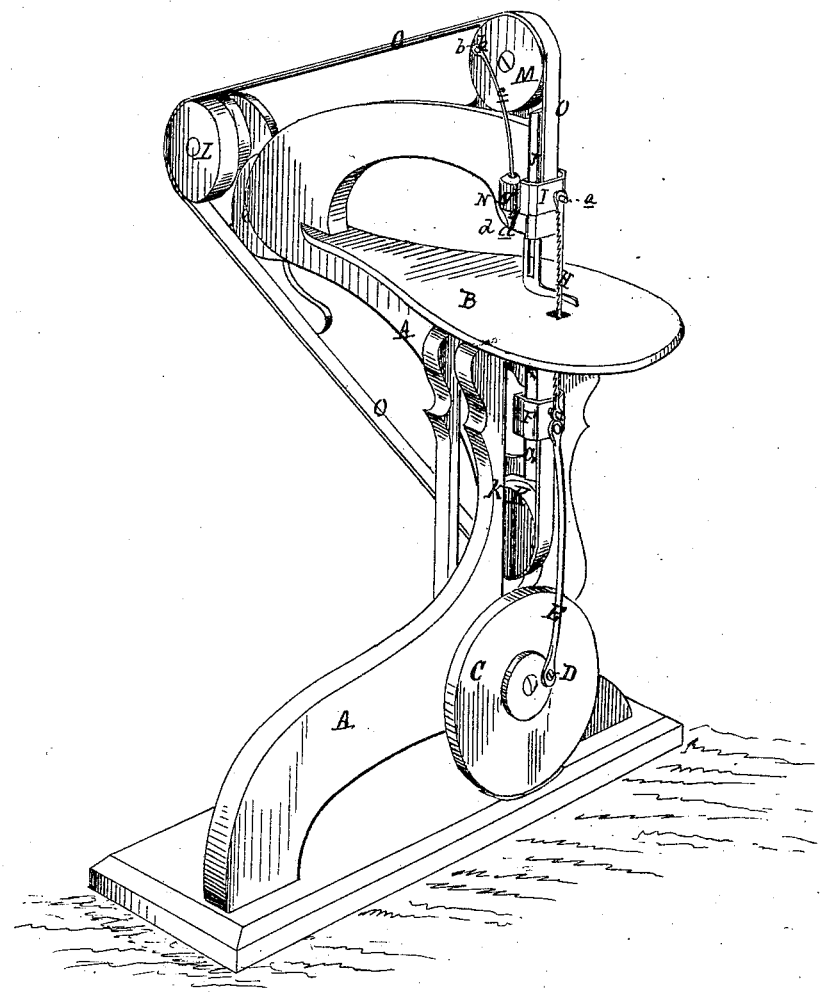

United States Patent Office.

GEORGE COOKE, OF NAPIER, CANADA.

Letters Patent No. 114,768, dated May 16, 1871.

IMPROVEMENT IN SCROLL-SAWING MACHINES.

The Schedule referred to in these Letters Patent and making part of the same.

*To all whom it may concern:*

Be it known that I, GEORGE COOKE, of Napier, in the county of Middlesex and Dominion of Canada, have invented a new and useful Improvement in Scroll-Sawing Machines; and I do declare that the following is a true and accurate description thereof, reference being had to the accompanying drawing and to the letters of reference marked thereon and being a part of this specification, in which my invention is shown in perspective.

The nature of this invention relates to an improved method of constructing scroll-sawing machines so that the saw may always be kept at a suitable tension—that is, provided with a small air-pump for the purpose of clearing away the sawdust—and wherein the upper end of the saw may be readily detached, when desired, and employed in fret-work, so-called.

The invention consists in securing to the upper and lower cross-heads, to which the saw is attached, a belt which passes over a combination of three pulleys, and so arranged that with each upward and downward reciprocation of the saw the pulleys have a semi-rotation backward and forward, carrying the belt with them, and thereby keeping the same tension on the saw at all times; also, in attaching to one of said pulleys a small air-pump for the purpose of blowing away the dust which accumulates in the use of the saw; also, in the new and ingenious method of so securing the upper end of the saw to its cross-head that it may readily be detached, when desired; also, in the novel arrangement and combination of the various parts to form a perfect machine for the purpose, and as more fully hereinafter described.

In the accompanying drawing—

A represents a suitable frame, to which is secured the operating parts of the machine, and which is surmounted by the usual table B, through which the saw has a reciprocating movement.

C is a balance-wheel secured to a driving-shaft, to which motion is given by any suitable power.

To a crank-pin, D, is attached the pitman E, the upper end of which is pivoted to the lower cross-head F, which works upon a slide, G.

The lower end of the saw H is secured to this cross-head.

Another cross-head, I, works upon a similar slide, J, and to this cross-head is secured the upper end of the saw by means of a hole drilled in said upper end of the saw, which engages with a wrist-pin, *a*, rigidly secured to the cross-head I.

Pulleys K L M are arranged relatively to each other, as shown, K being directly below the lower cross-head, M being directly above the upper cross-head, and both cross-heads and pulleys K M all being in line. The pulley L is situated in line with K M and at some distance in the rear, and may be secured, as shown, to a prolongation in the rear of the frame, or to a post, or any other suitable place.

A belt, O, is attached at one end to the lower cross-head, and thence is led downward around the pulley K, thence upward and around pulley L, and thence over pulley M downward, and the opposite end secured to the upper cross-head.

To the pulley M, by means of a crank-pin, *b*, is attached a connecting-rod, *c*, the other end of which is secured to a piston working in the air-pump N, to the lower end of which is secured the funnel-shaped pipe *d*, by means of which, with each reciprocation of the piston, a current of air is forced to the top of the table to blow off the sawdust.

What I claim as my invention, and desire to secure by Letters Patent, is—

The combination of the frame A, table B, balance-wheel C, crank-pin D, pitman E, cross-heads F I, slides G J, saw H, pulleys K L M, air-pump N, crank-pin *b*, rod *c*, and belt O, constructed and operating substantially as described and shown, for the purposes set forth.

GEORGE COOKE.

Witnesses:
 THOS. S. SPRAGUE,
 MARTHA STEWART.